June 7, 1927. 1,631,149
J. F. O'CONNOR
FRICTION SHOCK ABSORBING MECHANISM
Filed Aug. 26, 1926 2 Sheets-Sheet 2
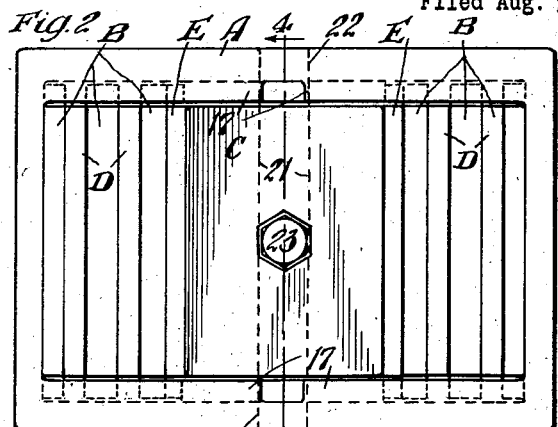
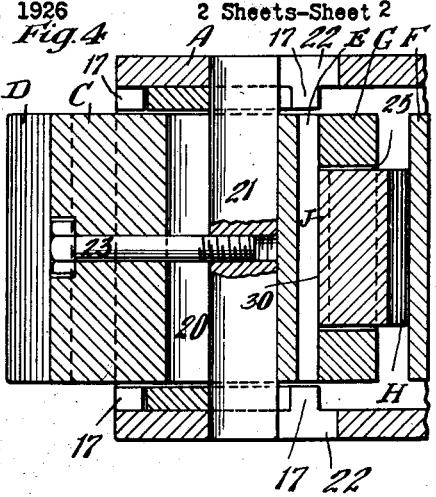
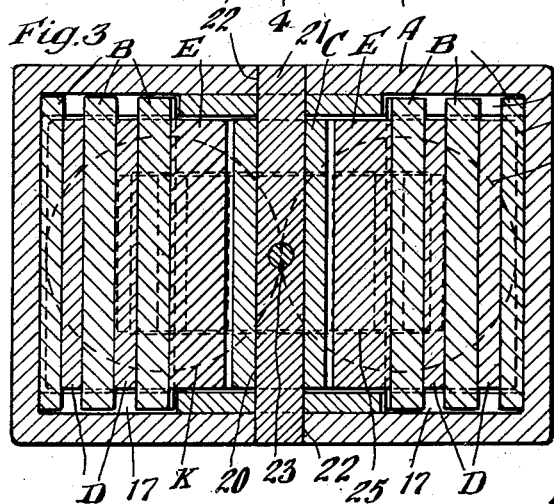
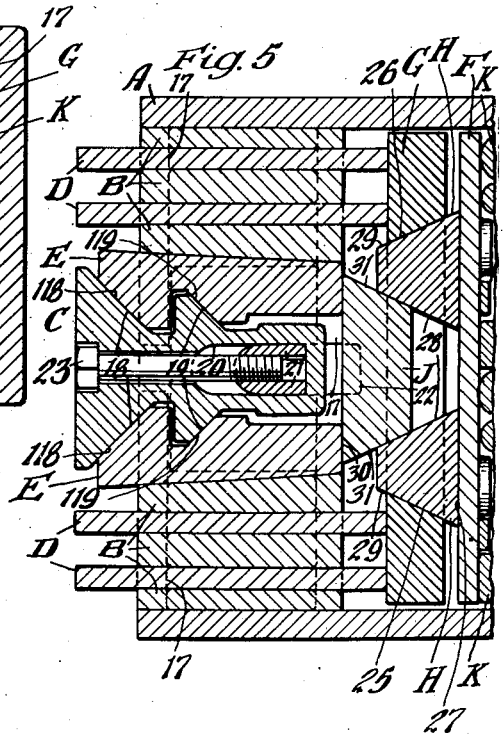
Witness
Wm. Geiger
Inventor
John F. O'Connor
By George I. Haight
His Atty.

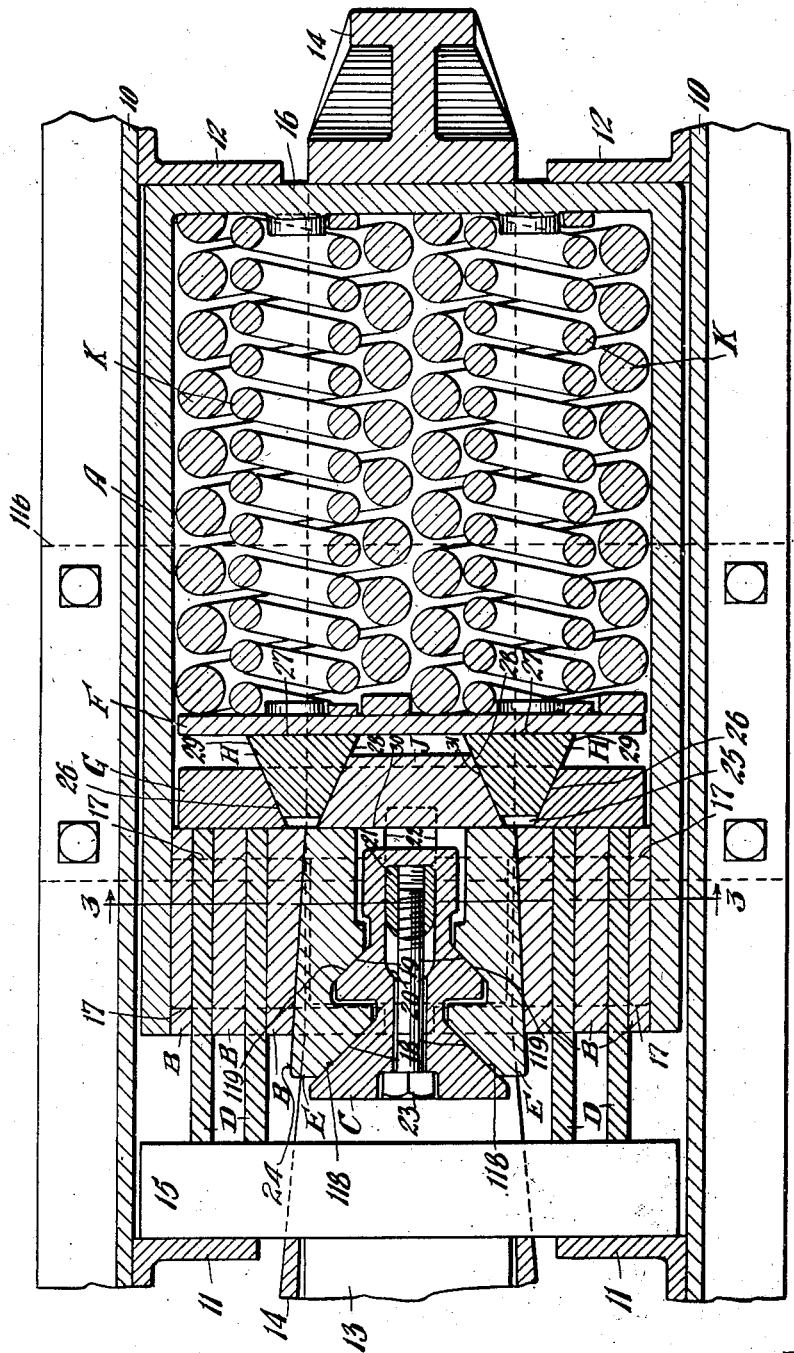

Patented June 7, 1927.

1,631,149

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed August 26, 1926. Serial No. 131,588.

This invention relates to improvements in friction shock absorbing mechanisms.

One object of the invention is to provide a friction shock absorbing mechanism having preliminary spring action together with high frictional capacity.

Another object of the invention is to provide a mechanism of the character indicated, especially adapted for railway draft riggings, including a main spring resistance element adapted to be compressed to a limited extent during the first part of the compression by pressure transmitting means which also functions as friction means during the remainder of the compression stroke in conjunction with friction elements, together with means for placing the friction elements and means under lateral pressure, including a wedge member and friction shoes, wherein the actuating force is applied to the wedge member after the main spring resistance has been compressed to said predetermined extent, and pressure equalizing means interposed between a pressure transmitting member, friction shoes and springs to at all times maintain the shoes in contact with the wedge member.

Other objects and advantages of the invention will more fully and clearly appear from the description and claims hereinafter following.

In the drawings, forming a part of this specification, Figure 1 is a longitudinal, horizontal, sectional view of a portion of a railway draft rigging, showing my improvements in connection therewith. Figure 2 is a front end elevational view of a shock absorbing mechanism proper. Figure 3 is a transverse vertical sectional view corresponding substantially to the line 3—3 of Figure 1. Figure 4 is a vertical longitudinal sectional view of the front end of the shock absorbing mechanism shown in Figure 1, corresponding substantially to the line 4—4 of Figure 2. And Figure 5 is a view corresponding to Figure 1, of the front end of the mechanism only, illustrating the position of the parts at the end of the free spring action of the gear, and at substantially the moment when the wedge means is rendered effective.

In said drawings, 10—10 denote channel-shaped center sills of a railway car underframe, to the inner sides of which are secured front stop lugs 11—11 and rear stop lugs 12—12. The inner end portion of the drawbar is designated by 13, to which is operatively connected a yoke 14 of well known form. The shock absorbing mechanism, hereinafter more fully described, as well as a front main follower 15, are disposed within the yoke and the yoke, with the parts contained therein, is supported in operative position by a detachable saddle plate 116 fixed to the draft sills.

The improved shock absorbing mechanism proper, as shown, comprises broadly: A spring casing A; a plurality of fixed friction plates B; a wedge member C; pressure transmitting elements D—D; friction shoes E—E; a spring follower F; an auxiliary follower G; differential wedge blocks H—H and J; and twin arranged spring resistance elements K—K.

The spring casing A is preferably of substantially rectangular cross-section and of box-like form provided with a transverse or end wall 16 co-operating with the stop lugs 12 in the manner of the usual rear follower. The top and bottom walls of the spring casing at the forward end are provided with upper and lower inwardly projecting transverse spaced ribs 17—17, two sets of ribs being provided on each top and bottom wall of the casing. The ribs serve as means for retaining the fixed friction plates B and top and bottom wear plates against longitudinal movement.

The friction plates B are arranged in sets at opposite sides of the mechanism, each set comprising three plates. The plates B are of identical design, except as hereinafter pointed out. Each of the plates B is notched along the top and bottom edges at the front and rear ends thereof, thereby presenting front and rear shoulders cooperating with the inner faces of the ribs 17 to retain the plates against longitudinal movement and hold the same assembled with the casing. It will be evident that by this arrangement lateral displacement of the plates is allowed. Each of the plates B has a pair of longitudinally disposed flat friction surfaces on the opposite sides thereof. The surfaces of the two outermost plates of each set are disposed parallel to the axis of the mechanism and the outer surfaces of the innermost plate of each set is also disposed parallel to the axis of the mechanism while the inner surfaces of said plate is inclined to said axis. The opposed surfaces of the innermost plates of the two sets thus converge inwardly of the mechanism.

The wedge block C has a transverse flat outer face normally spaced from the inner surfaces of the front follower 15 and adapted to be engaged thereby when the mechanism has been compressed to a predetermined extent. The wedge block C is provided with two sets of wedge faces 18—18 and 19—19, the wedge faces 19 being disposed rearwardly of the faces 18. As most clearly shown in Figure 1, the wedge block is provided with a longitudinally extending vertical slot 20 adapted to receive a key 21, which is mounted in aligned slots 22 in the top and bottom walls of the casing A. The retainer bolt 23 is adjustably connected to the key 21, being threaded into the same and has the head thereof seated in a recess at the forward end of the wedge block C. The retainer bolt holds the wedge assembled with the casing and limits the outward movement of the wedge. By means of the retainer bolt, the position of the wedge with reference to the casing A may be adjusted.

The friction shoes E are disposed on opposite sides of the wedge C and co-operate with the innermost friction plates B. The shoes are of like design, each having a pair of wedge faces 118—119 on the inner sides thereof adapted to co-operate respectively with the wedge faces 18 and 19 at the same side of the wedge block C. On the outer side, each shoe is provided with a longitudinal flat friction surface 24 correspondingly inclined to and adapted to co-operate with the inclined friction surfaces on the corresponding plate B.

The pressure transmitting elements D are in the form of elongated rectangular plates and are alternated with the plates B. As clearly shown in Figure 1, the elements D are four in number, and are arranged in sets at opposite sides of the mechanism. The outer ends of the elements D bear at all times on the inner surface of the front follower 15.

The spring follower F is in the form of a substantially rectangular plate and bears on the front ends of the spring resistance elements K—K.

The auxiliary follower G is also in the form of a rectangular plate, but is heavier than the plate F. As shown, the plate G is provided with a central opening 25 having rearwardly diverging faces 26 on the opposite sides thereof. The auxiliary follower G is interposed between the inner ends of the friction elements, plates B and the spring follower F.

The differential wedge blocks H, H and J, are interposed between the rear ends of the friction shoes E and the spring follower F. The differential blocks H are of the same design, each having a flat transverse end face 27 bearing on the front side of the spring follower F. Each block H also has a pair of forwardly converging wedge faces 28 and 29, the wedge face 29 of each block being correspondingly inclined to and adapted to co-operate with the faces 26 at the corresponding side of the auxiliary follower G. The differential block J is provided with a front flat end face 30 adapted to bear on the inner ends of the friction shoes E. The block J is also provided with a pair of inwardly converging wedge faces 31—31 adapted to co-operate with the wedge faces 28 of the differential blocks H.

The spring resistance elements K comprise two units, each including a relatively heavy outer coil, and a lighter inner coil, the coils of each unit having their opposite ends bearing respectively on the transverse end wall 16 of the casing A and the inner side of the spring follower plate F. The normal position of the parts of the mechanism is that illustrated in Figure 1, wherein the auxiliary follower G is in engagement with the inner ends of the plates B and also in engagement with the inner ends of the pressure transmitting elements D, holding the latter in their outermost position. The springs K maintain the wedge faces of the differential blocks H, H and J in engagement, thereby yieldingly maintaining the friction shoes E in their outermost position with the wedge faces thereof in engagement with the wedge faces of the block C.

The operation of my improved shock absorbing mechanism, assuming a compression stroke, is as follows: As the front follower 15 and the casing A approach each other, the pressure transmitting elements D will be moved inwardly of the mechanism, thereby moving the auxiliary follower inwardly also and forcing the differential blocks H rearwardly while at the same time pressing the same against the differential block J, thereby urging the same forwardly and holding the friction shoes in their outermost position. Due to the inward movement of the differential blocks H, the spring follower F will be moved rearwardly also, causing the springs K to be compressed. The described action will continue until the front follower 15 engages the wedge block C, whereupon a wedging action will be set up between the wedge and the friction shoes E, placing the plates and pressure transmitting elements under lateral pressure. The position of the parts at this stage of the operation is illustrated in Figure 5. It will be evident that during the initial action of the mechanism, that is, prior to engagement of the wedge block by the front follower, there will be substantially no friction created between the pressure transmitting elements and the friction plates B. However, as soon as the lateral wedging action is set up between the shoes and the wedge C, the plates will be forced tightly against the pressure transmitting elements, thereby creating high friction between these plates during the relative longitudinal movement between the same as the compression of the mechanism progresses. After the wedge block C has been engaged by the follower 15 the pressure transmitting elements D and the friction shoes E will be moved in unison rearwardly of the mechanism. During this action, due to the converging relation of the opposed friction surfaces on the innermost plates B, the friction shoes E will be forced laterally toward each other, slipping on the wedge faces of the wedge block, thereby causing a rearward motion of the differential block J at a speed exceeding the speed of movement of the main follower 15. Due to this movement of the differential block J, an additional compression of the main springs will be effected. The described action will continue either until the actuating force is reduced or the front follower comes into engagement with the front end of the casing A whereupon the pressure will be transmitted directly through the casing to the draft sills, the casing acting as a solid column load transmitting member.

When the actuating force is reduced, the expansive action of the springs K will force the differential blocks H forwardly, thereby causing an outward movement of the auxiliary follower G and the differential block J, thereby effecting outward movement of the pressure transmitting elements D, friction shoes E and wedge C, restoring all of the parts to their normal position. It will be evident that by providing the differential blocks H, H and J, the pressure will be maintained on the rear ends of the friction shoes E at all times, thereby yieldingly maintaining the latter in engagement with the wedge faces of the wedge block C.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a follower acting member and a follower relatively movable toward and away from each other; of a plurality of relatively stationary friction plates anchored to said member against longitudinal movement, but responsive to laterally applied pressure; of a main spring resistance; wedge acting means adapted to apply lateral pressure to said friction plates; pressure transmitting elements interposed between the friction plates and extending beyond said wedge acting means and interposed between the follower and main spring resistance; and pressure equalizing means interposed between the spring resistance and wedge acting means and co-operating with the pressure transmitting elements.

2. In a friction shock absorbing mechanism, the combination with a casing and a main follower relatively movable toward and away from each other; a plurality of relatively stationary friction plates anchored to the casing; a spring resistance within said casing; pressure transmitting elements co-operating with the friction plates and engaging the main follower; wedge means normally spaced from said follower; friction shoes co-operating with the wedge means and friction plates; and differential means interposed between the pressure transmitting elements and main springs, said differential elements acting to transmit the force of the main spring to the friction shoes to yieldingly resist movement of the latter during operation of the mechanism.

3. In a friction shock absorbing mechanism, the combination with a casing and a main follower relatively movable toward and away from each other; of a plurality of friction plates fixed with respect to the casing, but responsive to laterally applied pressure; friction shoes co-operating with the plates; a wedge member co-operating with the shoes; pressure transmitting elements co-operating with the friction plates and extending outwardly beyond the wedge member and engaging the main follower; a spring resistance means within the casing; a spring follower co-operating with said spring resistance; an auxiliary follower bearing on the inner ends of the pressure transmitting elements; a differential wedge block bearing on the inner end of the friction shoes; and a pair of differential wedge blocks co-operating with said auxiliary follower and first named differential wedge block respectively, and bearing on the spring follower.

4. In a friction shock absorbing mechanism, the combination with a casing, and a follower member relatively movable toward and away from each other; of a plurality of relatively stationary friction plates anchored to said member against longitudinal movement but responsive to laterally applied pressure; wedge acting means including friction shoes co-operating with said plates and arranged to apply lateral pressure thereto; power transmitting elements interposed between the friction plates and movable longitudinally with reference thereto, said power transmitting elements normally projecting outwardly beyond said wedge acting means; a spring resistance within the casing; and equalizing means cooperating with said power transmitting elements, friction shoes and spring resistance elements for yieldingly opposing inward movement of the friction shoes during the entire stroke of the mechanism.

In witness that I claim the foregoing I have hereunto subscribed my name this 23rd day of August 1926.

JOHN F. O'CONNOR.